US008328158B2

(12) United States Patent
Crispen

(10) Patent No.: US 8,328,158 B2
(45) **Date of Patent: *Dec. 11, 2012**

(54) AUTOMOTIVE HIGH PRESSURE PUMP SOLENOID VALVE WITH LIMP HOME CALIBRATION

(75) Inventor: Rodney E. Crispen, Yorktown, VA (US)

(73) Assignee: Continental Automotive Systems US, Inc., Auburn Hills, MI (US)

(*) Notice: Subject to any disclaimer, the term of this patent is extended or adjusted under 35 U.S.C. 154(b) by 812 days.

This patent is subject to a terminal disclaimer.

(21) Appl. No.: 12/314,637

(22) Filed: Dec. 15, 2008

(65) Prior Publication Data

US 2010/0147266 A1 Jun. 17, 2010

(51) Int. Cl.
*F16K 31/02* (2006.01)

(52) U.S. Cl. .................... 251/129.18; 251/337; 123/446

(58) Field of Classification Search ............. 251/129.15, 251/337, 129.18; 417/505; 123/446, 457
See application file for complete search history.

(56) References Cited

U.S. PATENT DOCUMENTS 6,446,610 B1 9/2002 Mazet
7,121,263 B2 10/2006 Eser
7,240,666 B2 7/2007 Okamoto
2005/0199846 A1* 9/2005 Kim et al. ................ 251/129.15
2006/0150932 A1* 7/2006 Naber et al. ............... 123/90.11
2006/0218953 A1* 10/2006 Hirota .......................... 62/228.5
2010/0111734 A1* 5/2010 Usui et al. ..................... 417/505
2010/0252763 A1* 10/2010 Courth et al. ............ 251/129.15
2010/0288953 A1* 11/2010 Czimmek et al. ........ 251/129.15

FOREIGN PATENT DOCUMENTS

EP 1701031 A1 * 9/2006

* cited by examiner

*Primary Examiner* — John K Fristoe, Jr.
*Assistant Examiner* — R.K. Arundale

(57) ABSTRACT

A module solenoid valve (14) includes a valve body (16) defining an inlet opening (22) and an outlet opening (20). The valve body includes a valve seat (18) at a distal end thereof. A valve member (24) controls flow of fuel through the outlet opening. A movable armature (26) is coupled with the valve member such that movement of the armature moves the valve member between a closed position and an open position. A stator (38) is associated with the armature. An electromagnetic coil (36) is associated with the stator and armature for causing movement of the armature towards the stator. A spring (32) biases the armature and thus the valve member to the closed position. The spring provides a spring force that is greater than a first, normal hydrostatic force applied to the valve seat, but less than a second, overpressure hydrostatic force applied to the valve seat.

10 Claims, 2 Drawing Sheets

AUTOMOTIVE HIGH PRESSURE PUMP SOLENOID VALVE WITH LIMP HOME CALIBRATION

TECHNICAL FIELD

The present disclosure relates to a direct injection high pressure pumps for automobiles and, more particularly, to calibration of an on-off valve for the pump inlet to ensure a limp home operation of the automobile in the event the valve fails.

BACKGROUND

In today's automotive engine systems, there is an increased demand for low cost, direct injection. In common rail injection systems, the fuel is delivered by means of a high pressure pump from a fuel tank to a fuel rail which serves as a storage reservoir for the fuel. The fuel is under high pressure in the fuel rail and can be injected directly into the cylinders via injection valves connected to the rail.

Typical direct injection, high pressure pumps of the type disclosed in U.S. Pat. No. 7,240,666 have a solenoid valve at the inlet to control flow rate through the pump. The solenoid valve is calibrated to auto-open on every cycle. This allows reduced flow even if the solenoid valve fails (for limp home operations), but does not provide precise control when the valve is operating properly.

With the methodology of the conventional solenoid valves for high pressure pumps, the solenoid valve only assists auto-open for longer flow control.

SUMMARY

There is a need to provide a solenoid valve for a direct injection high pressure pump for an automobile that is calibrated to prevent auto-open during normal operation of the valve, and if the valve or driver thereof fails, to ensure limp home operation of the vehicle.

An object of the invention is to fulfill the need referred to above. In accordance with the principles of the present invention, this objective is achieved by providing a solenoid valve for a direct injection, high pressure pump of an automobile fuel delivery system. The solenoid valve includes a valve body defining an inlet opening and an outlet opening in communication with the inlet opening. The valve body including a valve seat at a distal end thereof. A valve member is least partially disposed in the valve body. The valve member has a sealing surface associated with the valve seat. A movable armature is coupled with the valve member such that movement of the armature moves the valve member between a closed position with the sealing surface engaging the valve seat to prevent fuel from passing through the outlet opening, and an open position with at least a portion of the valve member moving outwardly from the distal end of valve body with the sealing surface being disengaged from the valve seat to permit fuel to pass through the outlet opening. A stator is associated with the armature. An electromagnetic coil is associated with the stator and armature for causing movement of the armature towards the stator. A spring is constructed and arranged to bias the armature and thus the valve member to the closed position. The spring is constructed and arranged to provide a spring force that is greater than a first, normal hydrostatic force applied to the valve seat, but less than a second, overpressure hydrostatic force applied to the valve seat to ensure that the valve member 1) will not move to the open position when the first, normal hydrostatic force is applied to the valve seat unless the coil is energized, and 2) will move to the open position when the second, overpressure hydrostatic force is applied to the valve seat in the event that the solenoid valve does not operate properly.

In accordance with another aspect of an embodiment, the invention, a method ensures a limp home operation of a vehicle having direct injection, high pressure pump with a solenoid valve for controlling flow rate of fuel through the pump. The method provides a solenoid valve associated with an inlet of a direct injection, high pressure pump. The valve includes a valve body defining an inlet opening and an outlet opening in communication with the inlet opening. The valve body includes a valve seat at a distal end thereof. A valve member is at least partially disposed in the valve body. The valve member has a sealing surface associated with the valve seat. A movable armature is coupled with the valve member such that movement of the armature moves the valve member between a closed position with the sealing surface engaging the valve seat to prevent fuel from passing through the outlet opening, and an open position with at least a portion of the valve member moving outwardly from the distal end of valve body with the sealing surface being disengaged from the valve seat to permit fuel to pass through the outlet opening. A stator is associated with the armature. An electromagnetic coil is associated with the stator and armature for causing movement of the armature towards the stator. A spring biases the armature and thus the valve member to the closed position. The valve member is prevented from moving to the open position when a first, normal hydrostatic force is applied to the valve seat unless the coil is energized. The valve member is permitted to move to the open position when a second, overpressure hydrostatic force is applied to the valve seat in the event that the solenoid valve does not operate properly so that fuel can be provided to the pump for limp home operation of the automobile.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF EXAMPLE EMBODIMENTS

Figure 1:
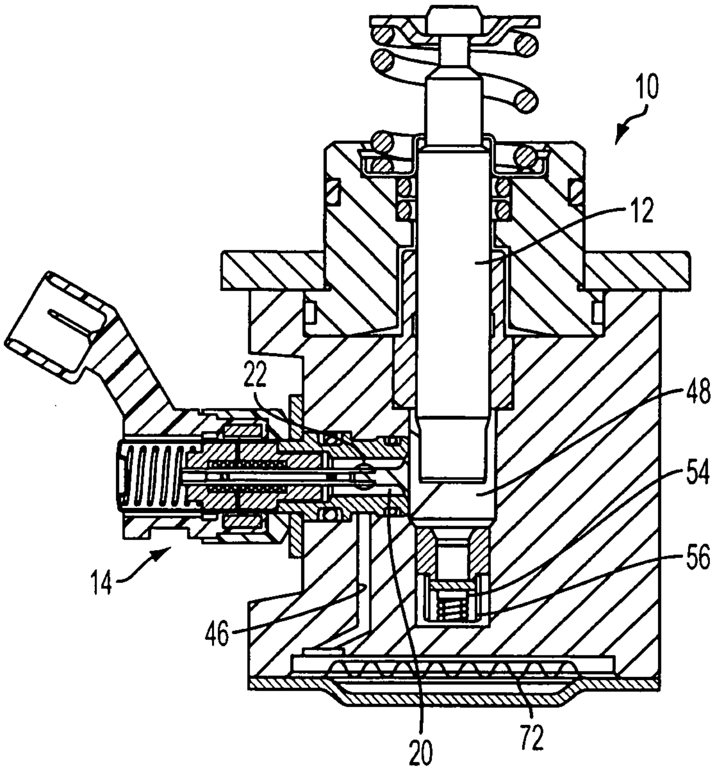
FIG. 1 is sectional view of a direct injection, high pressure pump having an on-off solenoid valve provided in accordance with an example embodiment of the present invention.

Referring to FIG. 1, a direct injection, high pressure pump is shown, generally indicated at 10, in accordance with an example embodiment of the present invention. The pump 10 is preferably of the conventional single-piston type having a piston 12 that that is associated with a camshaft to bring fuel to the required high pressure levels.

Figure 2:
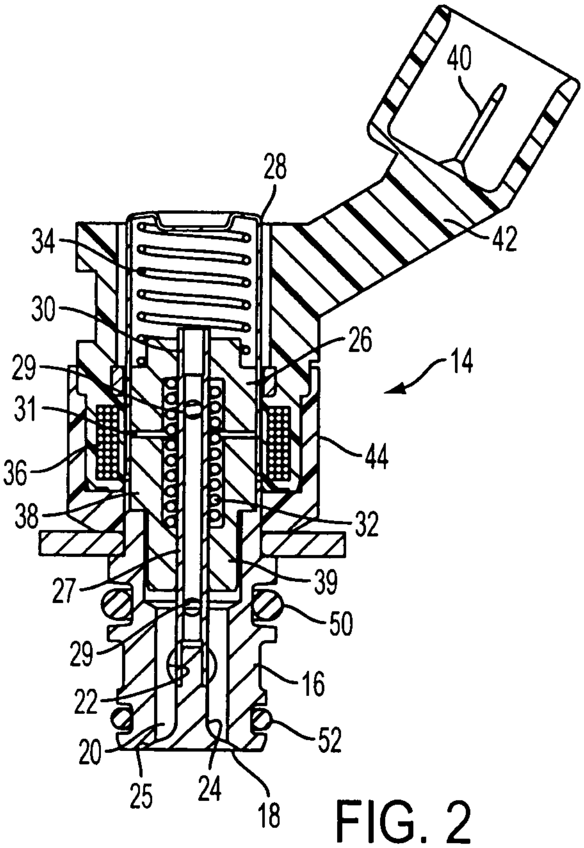
FIG. 2 is an enlarged sectional view of the solenoid valve of FIG. 1.

The pump 10 includes a module solenoid valve, generally indicated at 14. With reference to FIG. 2, the solenoid valve 14 includes a body 16 having a valve seat 18. The valve seat 18 surrounds a fuel outlet opening 20 that is in communication with an inlet opening 22 in the body 16. In the embodiment, the inlet opening 22 is generally transverse with respect to the outlet opening 20.

A valve member 24, as a means for controlling flow, is moveable within the body 16 between a first, seated or closed position and a second, open position. In the closed position, a sealing surface 25 of the valve member 24 is urged against the valve seat 18 to close the outlet opening 20 against fuel flow. In the open position, the valve member 24 and thus sealing surface 25 is spaced outwardly from the valve seat 18 to allow fuel flow through the outlet opening 20, the function of which will be explained below. The valve member 24 includes a hollow valve tube 27 that has openings 29 therein at opposite ends of the valve tube 27. Fuel is permitted to flow through the openings 29 to ensure that fuel pressure is the same throughout the internal portion of the valve 10. The location of the openings 29 ensures that fuel pressure is the same above and below an armature 26 and at an armature gap 31.

The armature 26 is fixed to an end 30 of the valve tube 27. The lift of the armature (static calibration of maximum flow rate) is performed by adjusting the location of the armature 26 with respect to the valve tube 27 and then laser welding the valve tube 27 to the armature 26.

A first, coil spring 32 biases the armature 26 and thus the valve member 24 towards the closed position. A second, lighter force coil spring 34 is provided between the armature 26 and a cover 28 for dynamic calibration the solenoid valve 14. In particular, the opening time and closing time of the solenoid valve 14 may be calibrated by adjusting the force of spring 34 on the armature 26. This adjustment is made by deforming the cover 28 to load the spring 34 to a desired biasing force on the armature 26. A bottom end of the cover 28 is welded to a pole or stator 38.

An electromagnetic coil 36 generally surrounds at least portions of the armature 26 and the stator 38. The stator 38 is formed of a ferromagnetic material. The stator 38 includes a guide portion 39 that guides the movement of the valve member 24 passing there-through. The electromagnetic coil 36 is powered via an electrical connector 40 and is operable, in the conventional manner, to produce magnetic flux to move the armature 26 towards the stator 38, thereby moving the valve member 24 to the open position and allowing fuel to pass through the fuel outlet opening 20. Deactivation of the electromagnetic coil 36 allows the spring 32 to return the valve member 24 to the closed position against the valve seat 18 and to align itself in the closed position, thereby closing the outlet opening 20, prevent flow of fuel form the solenoid valve 14. The electromagnetic coil is DC operated. The coil 36 and connector 40 are preferably overmolded with plastic and are thus integral with a plastic connector body 42. A housing 44 receives a portion of the connector body 42.

The valve body 16, valve member 24, stator 38, armature 26, and spring 32 can be assembled as a unit and then the spring 34 and cover can be assembled to the unit to define a fuel module. The connector body 42 with coil 36, and the housing, can then be coupled as a power assembly to the fuel module. Thus, the coil 36 or entire power assembly can be manufactured in an area different from the manufacture area of the fuel module. Furthermore, it can be appreciated that the solenoid valve 14 can be assembled and tested in a modular fashion which can reduce scrap. Due to this modular configuration, it is easy to change the length of the solenoid valve 14 and the type of electrical connector body 42.

Returning to FIG. 1, the solenoid valve 14 is placed in within the pump 10 so that an inlet port 46 of the pump 10 communicates with the inlet opening 22 of the solenoid valve 14. The outlet opening 20 of the solenoid valve 14 communicates, when open, with a pump compression area 48. O-rings 50 and 52 (FIG. 2) seal the valve body 16 with respect to the pump 10. A check valve 54 is positioned in an outlet 56 of the pump 10.

Figure 3:
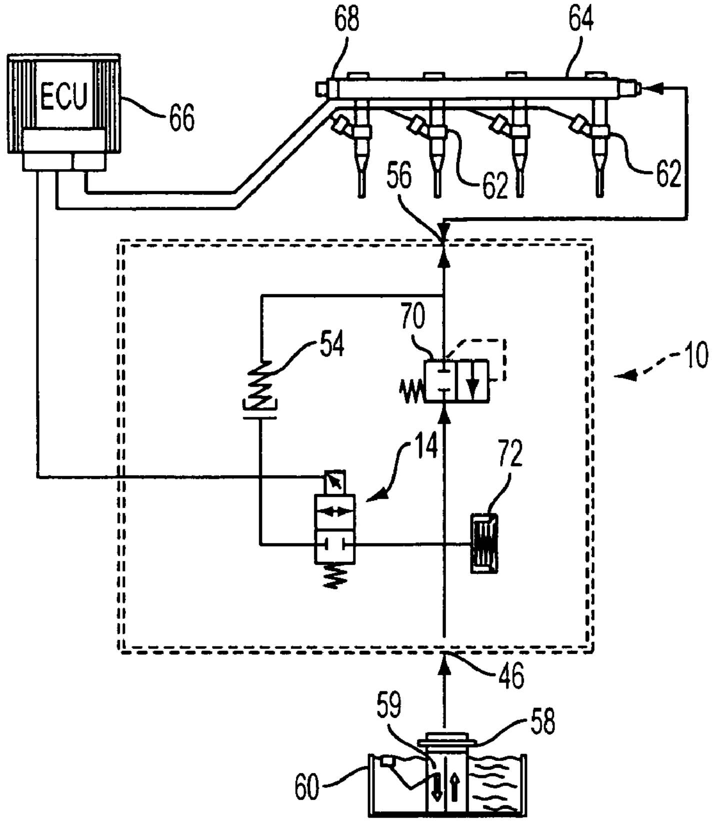
FIG. 3 is a schematic view of the pump with solenoid valve of FIG. 1 in a fuel supply system.
Figure 4:
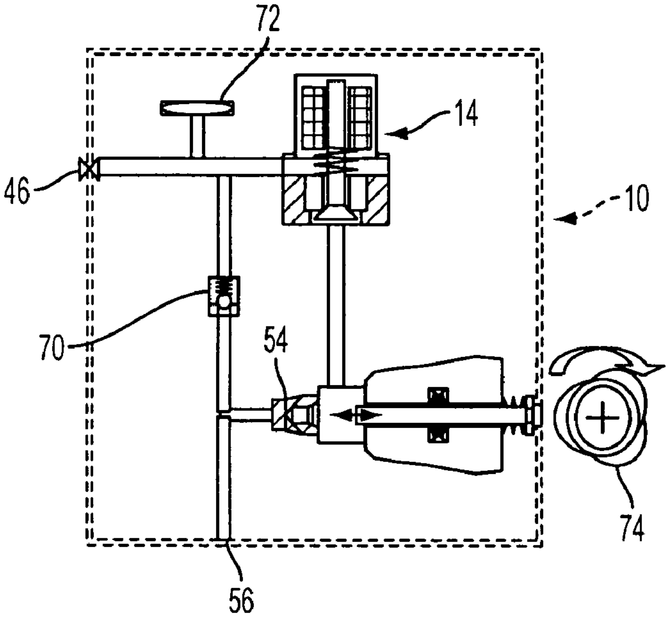
FIG. 4 is a detailed view of the pump with solenoid valve of FIG. 3.

With reference to FIG. 3, the pump 10 with solenoid valve 14 is shown schematically in a fuel delivery system of an automobile. In particular, the fuel delivery system has a fuel supply unit 58 with a low pressure pump 59 in a fuel tank 60. A plurality of fuel injectors 62 is associated with a fuel rail 64. The pump 10 is provided between the fuel supply unit 58 and the fuel rail 64 to provide high pressure fuel to the fuel rail 64. An electronic control unit 66 controls the fuel injectors 62, the solenoid valve 14, and a fuel pressure sensor 68. As shown in FIGS. 3 and 4, the pump 10 includes the solenoid valve 14, the outlet check valve 54, an overpressure valve 70 and a damper 72. As shown in FIG. 4, the pump 10 is associated with camshaft lobes 74 in the conventional manner.

The control of the pump 10 is achieved by allowing fuel to be drawn into the pump 10 through the on/off solenoid valve 14. Without the use of the solenoid valve 14, all fuel sent to the pump 10 would be delivered to the rail 64. To control the flow rate through the pump 10 and thus to reduce the fuel delivery to the rail 64, the solenoid valve 14 is held open during start of the compression stroke of the pump 10, then closed quickly so only the needed fuel is supplied to the rail 64. When the solenoid valve 14 is open during the compression stroke, fuel flows backwards through the solenoid valve 14. When the solenoid valve 14 is allowed to close, the remaining fuel is compressed in the pump 10 and pumped out of the pump 10 past the outlet check valve 54 to the rail 64.

To ensure that the solenoid valve 14 will not auto-open during normal operation of the of the valve 14 and pump 10 and thus only open by precise solenoid control, and to only auto-open upon failure of operation of the valve 14, the force of the spring 32 is calibrated with respect to the valve body 16 and valve seat 18 to achieve a force balance that is between a normal supply pressure and an over supply pressure situation. In particular, the spring 32 is constructed and arranged to provide a spring force that is greater than a first, normal hydrostatic force (typically about 6 bar) applied to the valve seat 18 from the low pressure fuel pump 59, but less than a second, overpressure hydrostatic force (typically about 9 bar) applied to the valve seat 18 due to an overpressure condition at the low pressure fuel pump 59 that may occur when the solenoid valve 14 is not operating properly. The valve 14 may not operate properly due to the valve 14 itself being faulty or due to a fault in the driver of the valve 14. The calibration of the force of the spring 32 ensures that the valve member 24 1) will not move to the open position when the first, normal hydrostatic force is applied to the valve seat 18 unless the coil 36 is energized, and 2) will move to the open position when the second, overpressure hydrostatic force is applied to the valve seat 18 in the event that the solenoid valve 14 does not operate properly to provide enough fuel to the high pressure pump 10 for limp home operation of the vehicle. Thus, the only time the low pressure fuel pump 59 would go into an overpressure operation is if the solenoid valve 14 failed to open under its own control.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A solenoid valve for a direct injection, high pressure pump of an automobile fuel delivery system, the solenoid valve comprising:

a valve body defining an inlet opening and an outlet opening in communication with the inlet opening, the valve body including a valve seat at a distal end thereof, a valve member at least partially disposed in the valve body, the valve member having a sealing surface associated with the valve seat, a movable armature coupled with valve member such that movement of the armature moves the valve member between a closed position with the sealing surface engaging the valve seat to prevent fuel from passing through the outlet opening, and an open position with at least a portion of the valve member moving outwardly from the distal end of valve body with the sealing surface being disengaged from the valve seat to permit fuel to pass through the outlet opening, a stator associated with the armature, an electromagnetic coil associated with the stator and armature for causing movement of the armature towards the stator, and a spring constructed and arranged to bias the armature and thus the valve member to the closed position, the spring being constructed and arranged to provide a spring force that is greater than a first, normal hydrostatic force applied to the valve seat, but less than a second, overpressure hydrostatic force applied to the valve seat to ensure that the valve member 1) will not move to the open position when the first, normal hydrostatic force is applied to the valve seat unless the coil is energized, and 2) will move to the open position when the second, overpressure hydrostatic force is applied to the valve seat in the event that the solenoid valve does not operate properly, wherein the spring is engaged between the armature and the stator, wherein the valve seat is constructed and arranged to receive the first, normal hydrostatic force and the second, overpressure hydrostatic force from a low pressure fuel pump.

2. The valve of claim 1, wherein the first, normal hydrostatic force is about 6 bar and the second, overpressure hydrostatic force is about 9 bar.

3. The valve of claim 1, wherein the spring is a coil spring.

4. The valve of claim 1, in combination with a high-pressure fuel pump, the valve being constructed and arranged to control a flow rate of fuel through the pump.

5. The combination of claim 4, in further combination with the low pressure fuel pump supplying fuel to the high pressure fuel pump, wherein the first, normal hydrostatic force is about 6 bar sent from the low pressure fuel pump to the high pressure fuel pump, and the second, overpressure hydrostatic force is about 9 bar sent from the low pressure fuel pump to the high pressure fuel pump.

6. The combination of claim 4, wherein the pump is a single piston pump.

7. A method of ensuring a limp home operation of a vehicle having direct injection, high pressure pump with a solenoid valve for controlling flow rate of fuel through the pump, the method comprising:

providing a solenoid valve associated with an inlet of a direct injection, high pressure pump, the valve comprising:

a valve body defining an inlet opening and an outlet opening in communication with the inlet opening, the valve body including a valve seat at a distal end thereof, a valve member at least partially disposed in the valve body, the valve member having a sealing surface associated with the valve seat, a movable armature coupled with the valve member such that movement of the armature moves the valve member between a closed position with the sealing surface engaging the valve seat to prevent fuel from passing through the outlet opening, and an open position with at least a portion of the valve member moving outwardly from the distal end of valve body with the sealing surface being disengaged from the valve seat to permit fuel to pass through the outlet opening, a stator associated with the armature, an electromagnetic coil associated with the stator and armature for causing movement of the armature towards the stator, and a spring engaged between the armature and the stator and constructed and arranged to bias the armature and thus the valve member to the closed position, preventing the valve member from moving to the open position when a first, normal hydrostatic force is applied to the valve seat unless the coil is energized, and permitting the valve member to move to the open position when a second, overpressure hydrostatic force is applied to the valve seat in the event that the solenoid valve does not operate properly so that fuel can be provided to the pump for limp home operation of the automobile, wherein the valve seat is constructed and arranged to receive the first, normal hydrostatic force and the second, overpressure hydrostatic force from a low pressure fuel pump.

8. The method of claim 1, wherein the preventing and permitting steps include:

ensuring a force of the spring is greater than the first, normal hydrostatic force, but less than the second, overpressure hydrostatic force.

9. The method of claim 8, wherein the first, normal hydrostatic force is about 6 bar and the second, overpressure hydrostatic force is about 9 bar.

10. The method of claim 9, with the low pressure fuel pump provides the first and second hydrostatic forces.

* * * * *